United States Patent [19]

Ip

[11] Patent Number: 5,608,825

[45] Date of Patent: Mar. 4, 1997

[54] MULTI-WAVELENGTH FILTERING DEVICE USING OPTICAL FIBER BRAGG GRATING

[75] Inventor: Joseph Ip, Kanata, Canada

[73] Assignee: JDS Fitel Inc., Nepean, Canada

[21] Appl. No.: 595,561

[22] Filed: Feb. 1, 1996

[51] Int. Cl.⁶ ........................................... G02B 6/28
[52] U.S. Cl. ........................... 385/24; 359/127; 359/130; 385/27
[58] Field of Search .................................. 385/15, 24, 27, 385/31, 39, 46, 47; 359/124, 127, 130

[56] References Cited

U.S. PATENT DOCUMENTS

| | | | |
|---|---|---|---|
| 5,280,549 | 1/1994 | Barnard et al. | 385/15 |
| 5,283,686 | 2/1994 | Huber | 359/337 |
| 5,404,413 | 4/1995 | Delavaux et al. | 385/15 |
| 5,416,629 | 5/1995 | Huber | 359/130 X |
| 5,448,660 | 9/1995 | Calvani et al. | 385/21 |
| 5,479,082 | 12/1995 | Calvani et al. | 359/127 |

*Primary Examiner*—John D. Lee
*Attorney, Agent, or Firm*—Neil Teitelbaum & Associates

[57] ABSTRACT

A multi-wavelength optical filtering device for optical signal transmission, capable for functioning as a multiplexer or a demultiplexer. The device has at least one (first) optical circulator having at least four ports including an input port and a plurality of sequential ports, the last of said sequential ports being an output port, and an in-fiber Bragg grating (wavelength selective means) coupled to each of said sequential ports except said output port. The circulator may be branched off to a number of other circulators, the number depending on the number of the sequential ports of the first circulator, through the Bragg grating rather than through the output port of the first circulator. The other circulators, which are preferably also at least four-port circulators with wavelength selective means at the sequential ports, can also be branched off in an analogous manner as the first circulator. The device allows a reduction of signal losses in optical signal transmission due to the passing of a signal between circulator ports.

11 Claims, 5 Drawing Sheets 5,608,825

MULTI-WAVELENGTH FILTERING DEVICE USING OPTICAL FIBER BRAGG GRATING

This invention relates to multi-wavelength filtering devices and more particularly to a multi-channel multiplexor/demultiplexor and method of multiplexing/demultiplexing using at least one multi-port optical circulator and a plurality of Bragg optical fiber gratings or other wavelength selective means.

BACKGROUND OF THE INVENTION

Optical systems are presently being employed in the communication of voice and video information as well as in the high speed transmission of data. Optical communication systems are desired because of the wide bandwidth available for the information signal channels.

Although this wide bandwidth is available, many of the existing optical fiber systems use only a single channel per optical fiber. Typically, this channel is transmitted at a wavelength of 1310 nm in one direction from a transmitting end to a receiving end and requires a second optical fiber to achieve bi-directional communication; however, recent increase in telecommunications traffic has resulted in a need for further fiber resources. One way this need was met, was to install additional optical fiber cables. Another was to increase the number of channels carried by some fibers.

Recently, technologies that can add additional channels to existing optical fiber cables already in the ground, have gained acceptance. These technologies seek to provide more than one channel on a single existing optical fiber and are therefore aimed at enhancing the efficiency of the existing fiber optic cable network. These technologies include wavelength division multiplexing (WDM) and bi-directional transmission.

When a number of wavelengths are multiplexed and transmitted on a single optical fiber, customarily, these channels must later be demultiplexed into separate channels or wavelengths of light. For example, it may be cost effective to transmit signals of wavelength $\lambda 1, \lambda 2, \lambda 3, \lambda 4, \lambda 5$, and $\lambda 6$ ($\lambda$ denoting a wavelength, lambda) along a single optical fiber, however, demultiplexing means are required to separate the light into six separate channels. Of course, it is desired to perform this demultiplexing at a minimum cost and with as little signal loss as possible.

Various types of optical filters have been contemplated and used to separate light of differing wavelengths. Unfortunately, coupling and other losses associated with many of these arrangements have led to devices that are less than satisfactory.

As of late, in-fiber Bragg gratings have become more prevalent in the field of fiber optics. An optical system utilizing Bragg gratings in combination with an optical circulator is shown in U.S. Pat. No. 5,283,686 issued Feb. 1, 1994 in the name of David Huber and assigned to General Instrument Corporation, Jerrold Communications, Hatboro, Pa.

It is an object of this invention to provide a multi-channel demultiplexor that is capable of demultiplexing a multi-channel signal with less loss than known prior art demultiplexors.

It is a further object of the invention to provide a multi-channel demultiplexor that is configured in a manner to minimize loss normally associated with serial-type architectures.

In accordance with one aspect of the invention, a multi-wavelength optical filtering device for optical signal transmission comprises an optical circulator having at least 4 ports, one of the at least 4 ports being an input port for receiving a plurality of wavelengths of light, another port being an output port, and at least two of the other ports each being coupled to a different wavelength selective element, preferably an in-fiber Bragg grating, each such element having different transmission characteristics.

In accordance with another aspect of the invention, the device further comprises a second optical circulator having at least three ports including an input port, and means for coupling one of said wavelength selective means of said device to said input port of said second optical circulator.

Preferably, each of the optical circulators has at least four ports. The number of the circulators coupled similarly as the first and second circulators can be significant. For the ease of understanding, the coupling of the circulators according to the invention, via the grating of one circulator being coupled to the input port of another circulator, will be termed "branching" or "parallel coupling" as opposed to the serial linking illustrated in FIG. 1.

The wavelength-selective means of the present invention (preferably in-fiber Bragg grating reflectors) are selected as necessitated by the specific arrangement to either reflect one particular wavelength and transmit all the other signals, or transmit one particular wavelength and reflect all the other signals.

The arrangements of the present invention can operate both in the multiplexor and demultiplexor mode.

BRIEF DESCRIPTION OF THE DRAWINGS

Exemplary embodiments of the invention will now be described in conjunction with the drawings, in which.

DETAILED DESCRIPTION

Figure 1:
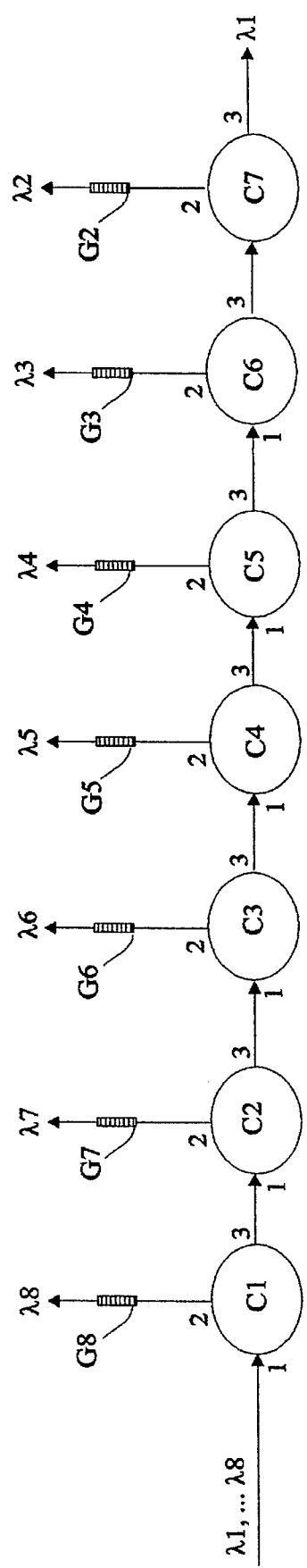
FIG. 1 is a schematic diagram of an 8 channel demultiplexor having serial chained 3-port optical circulators utilizing Bragg optical fiber gratings.

FIG. 1 shows, for the purpose of illustration and comparison with the preferred embodiments of the present invention, an eight-channel demultiplexor that utilizes seven 3-port optical circulators and seven in-fiber Bragg gratings. The circulators are chained in series of demultiplex 8 channels. Port 2 of each of the 7 circulators is coupled to a different high-pass Bragg fiber grating for passing a different wavelength of light. In operation, multiple wavelengths of light, $\lambda 1, \lambda 2, \ldots$ to $\lambda 8$ are provided to an input port of the device, at port 1 at an input end shown on the left. The light passes from port 1 to port 2 and to the Bragg grating labeled G8. Light of wavelength $\lambda 8$ passes though the grating G8 and other remaining wavelengths $\lambda 1, \lambda 2, \ldots$ to $\lambda 7$ are reflected backwards (circulating) from port 2 to port 3 and out of the first optical circulator C1 to the second optical circulator C2. In a similar manner, light of wavelength $\lambda 1$, λ2, . . . to λ6 passes from port 1 to port 2 of C2. Light of wavelength λ7 passes though the grating G7 and other wavelengths λ1, λ2, . . . to λ6 are reflected backwards and rotated from port 2 to port 3 and out of the second optical circulator C2 to the third optical circulator C3. This serial process continues until the last wavelength of light λ1 is output on port 3 of the last circulator C7 in the chain of circulators.

Although this design performs its intended function, it has severe limitations. For instance, for light of wavelength λ7 to be demultiplexed, that light must pass through port 1 to port 2 of C1, port 2 to port 3 of C1 and from port 3 of C1 to port 1 of C2 and from port 1 to port 2 of C2. The losses associated with light passing from port 2 to port 3 of a first circulator and from passing from port 1 to port 2 of a next adjacent circulator are in some instances prohibitive. Since these circulators are serially chained, these losses are even more profound for light of wavelength λ1 which circulates through 7 circulators and undergoes cumulative output/input losses six times.

Figure 5:
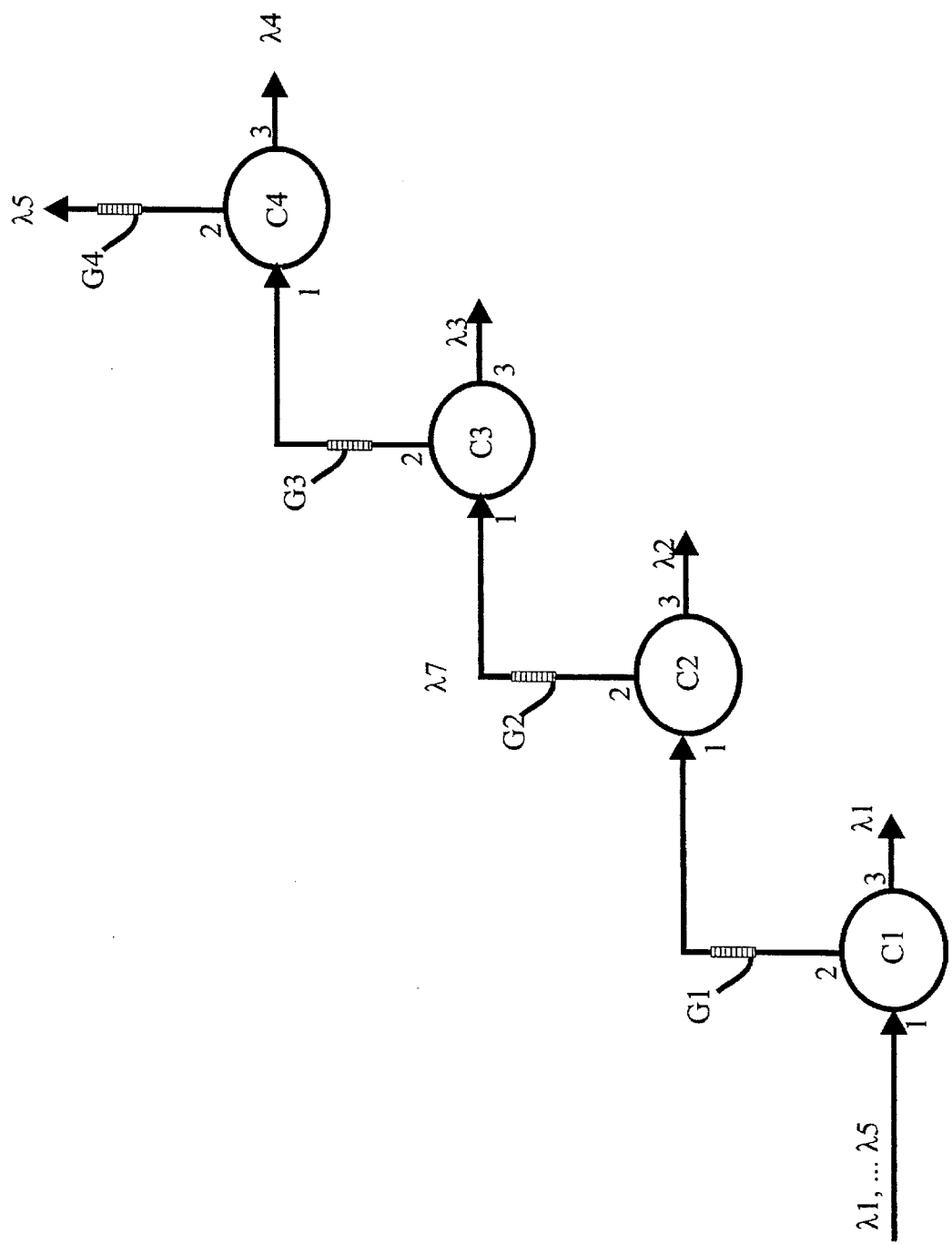
FIG. 5 is a schematic diagram of multiple 3-port optical circulators shown connected in an embodiment alternative to FIG. 1.

It is conceivable, although not preferable, to chain the three-port circulators of FIG. 1 such that it is the port 2 of circulator C1, rather than the output port thereof, that is coupled via its respective grating to the input port of circulator C2. The latter could optionally be coupled to the next circulator, say C3, by way of the respective grating being coupled to the input port of the circulator C3 etc. as shown in FIG. 5

The resulting system would perform for instance in a following manner: the signals λ1 . . . λ8 would be passed through the input port of circulator C1 and rotated to the second port. Wavelengths λ2–λ7 would pass through the grating and to the input port of C2, while the wavelength λ8 would be reflected from the grating and circulated to the output port of the circulator C1. Wavelengths λ2 . . . λ7 would then be separated as desired by means of the selected gratings coupled to the respective second ports of consecutive circulators.

While this mode of operation may conceivably be useful and the above-described embodiment is intended to constitute part of the present invention, it is perceived as having a similar drawback as the serial system of FIG. 1, i.e. relatively high transmission losses due to a relatively high number of port-to-port passages compared to the number of wavelengths to be demultiplexed. The maximum loss of this "hypothetical" scenario will be discussed below.

Figure 2:
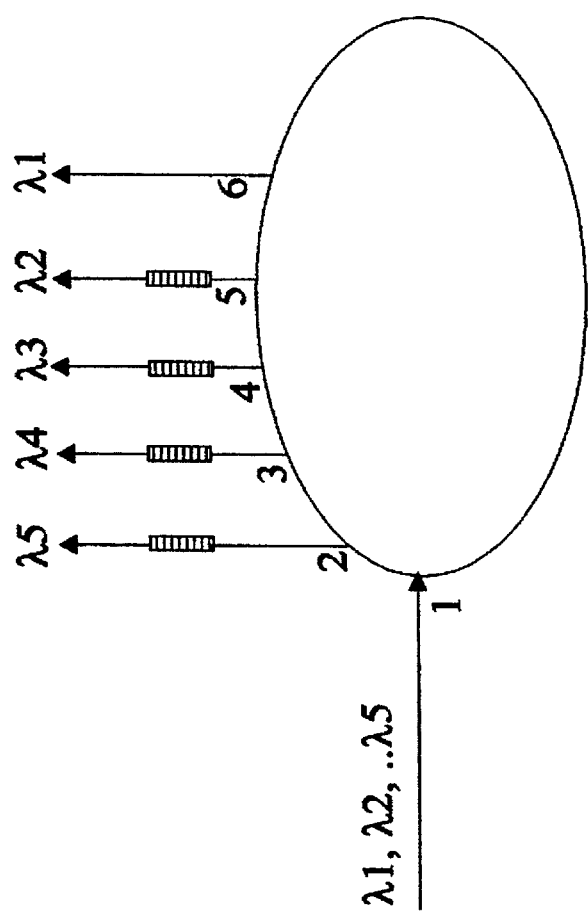
FIG. 2 is a schematic diagram of a 6-port 5-channel demultiplexor in accordance with the invention.

FIG. 2 shows a device of the invention which has a 6-port optical circulator operating in the demultiplexor mode. The combined signal λ1. λ2 . . . λ5 is passed to the input port 1, circulated to the second port 2 whereby wavelength λ5 is transmitted through the grating coupled with port 2. The remaining signals are reflected from the grating and circulated to the next ports 3, 4, 5 and 6. As seen in FIG. 2, the wavelengths λ4, λ3, λ2 and λ1 undergo a transmission and separation through relatively few port-to-port passages. The "longest-travelling" wavelength λ1 passes a total of five port-to-port steps, with related signal losses. It can easily be concluded that, when the losses incurred by Bragg grating are ignored in all the scenarios discussed herein as identical, the maximum loss for a wavelength λn can be represented by an equation $$Xmax=Xs(n-1)$$

where Xs is loss at a single port-to-port pass and n is a number of wavelengths to be demultiplexed.

For comparison, a similar combined signal composed of five wavelengths, when demultiplexed via a system of FIG. 1, would encounter eleven port-to-port losses. Here, the maximum loss for a wavelength λn (1=at least 3) can be represented by an equation $$Xmax=Xs(3n-4)$$

wherein the terms are the same as in the equation above.

In the arrangement of FIG. 5 (FIG. 1 modified by linking the gratings to input ports of next circulators), the maximum loss of the "longest travel" would be represented by the equation:

$$Xmax=Xs(2n-3)$$

It is easy to conclude that for any practical number of combined wavelengths in a multiplexed optical signal, the losses are highest in the arrangement of FIG. 1 and lowest in the arrangement of FIG. 2. This conclusion is however based on the assumption that the port-to-port losses are identical for a three-port circulator and for a four-and-more port circulator. This assumption may not be accurate, but it is reasonable to conclude that for any number of ports equal to or greater than four, the arrangements of the invention offer a reduction of signal losses compared to prior art systems.

Figure 3:
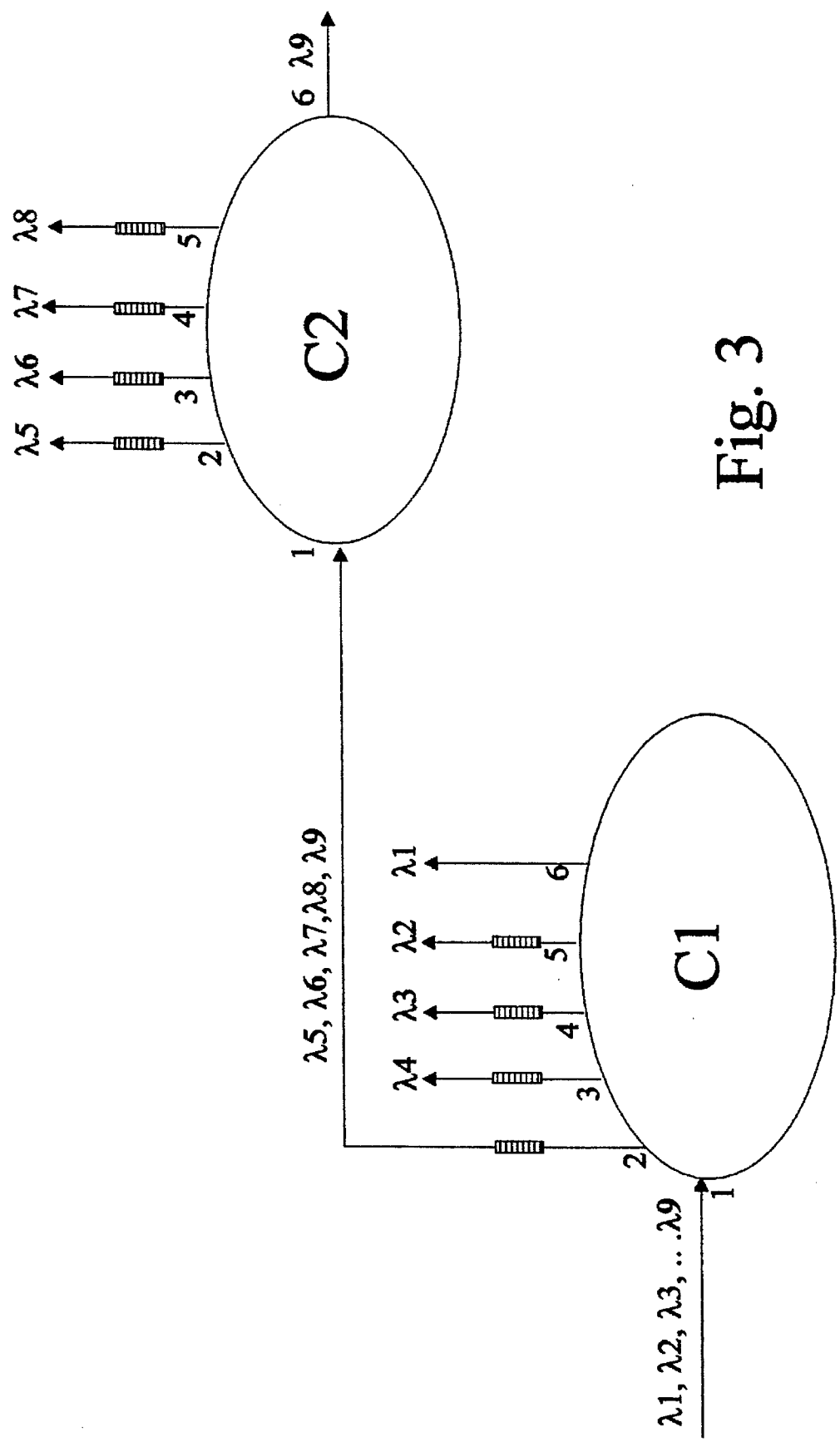
FIG. 3 is a schematic diagram of two 6-port optical circulators defining a parallel configuration.

FIG. 3 illustrates a two-circulator system, operating in a demultiplexor mode, with the reference symbols analogous to those of FIG. 2. The first circulator C1 is branched off to the second circulator C2 via the Bragg grating at the port 2 of C1. It will be seen again that an optical signal λ1, λ2 . . . λ9 can be demultiplexed by incurring relatively few port-to-port losses compared with the arrangement of FIG. 1. Both circulators may have the same number of ports (six in the embodiment illustrated) but the number may be different. Advantageously, for minimizing the signal losses as explained herein, at least the first circulator (C1 in the demultiplexor mode shown in FIG. 3) should have at least four ports including an input port, two sequential circulating ports and an output port.

Figure 4:
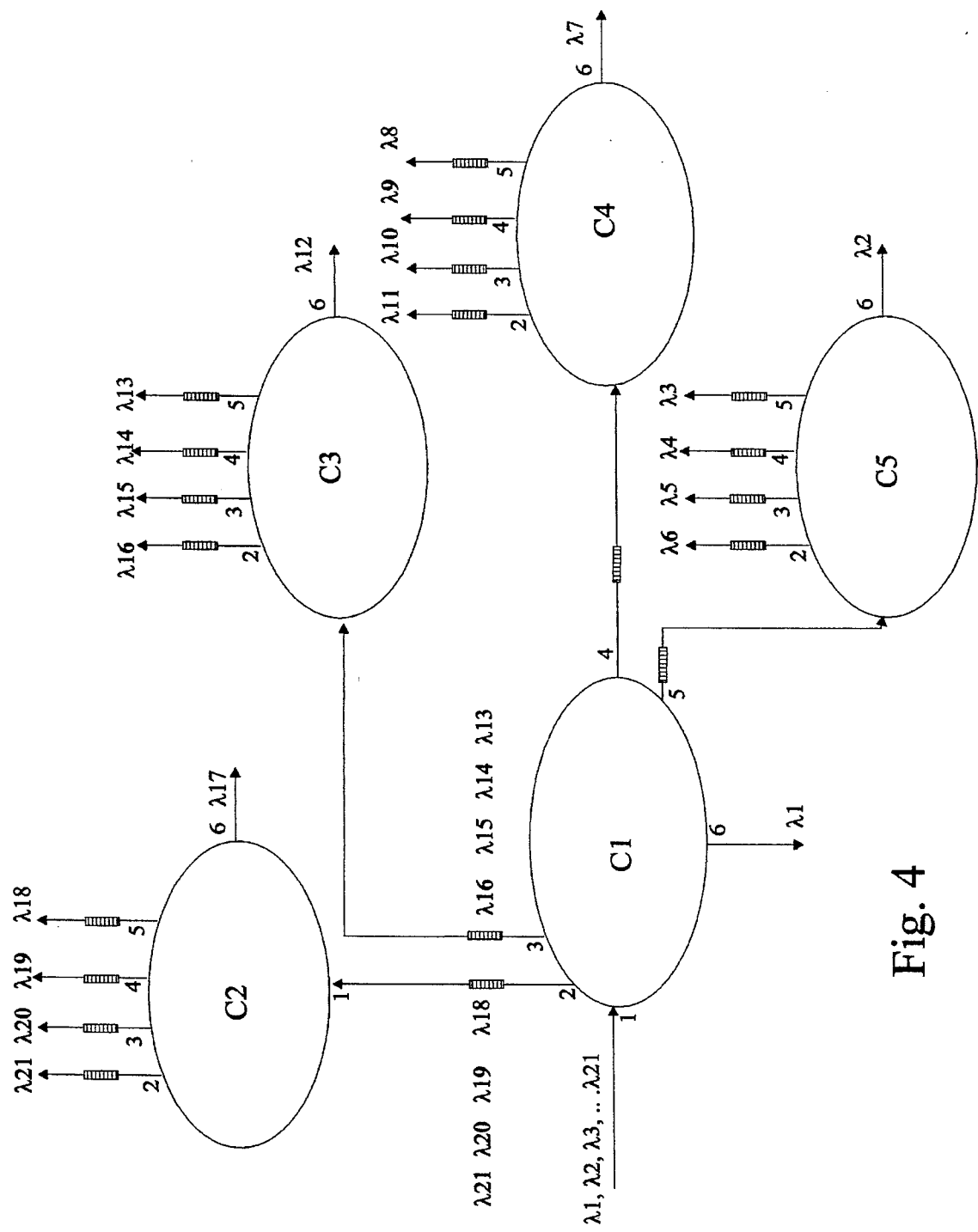
FIG. 4 is a schematic diagram of five 6-port optical circulators capable of demultiplexing 21 channels.

FIG. 4 illustrates a five-circulator system analogous to that of FIG. 3. It is seen that all four Bragg gratings of the first circulator C1 are coupled to input ports of the associated circulators C2, C3 and C4. The associated circulators may have six ports each as in FIG. 4, but may also have fewer ports with a minimum of three.

It is again clear that the number of port-to-port steps, with inherent signal losses, is relatively low. For example, the "longest traveller", the wavelength 12 passes through only 10 port-to-port steps between the input port 1 of circulator C1 and the output port 6 of the circulator C5.

All the above-discussed arrangements, as mentioned above, are capable of operating in a multiplexor mode. By way of example, the basic embodiment of FIG. 2 will be so operable by using ports 2, 3, . . . 6 as input ports, and port 1 as the output port. The other arrangements can be converted correspondingly if so desired.

I claim:

1. A multi-wavelength optical filtering device for optical signal transmission, said device comprising:

a first optical circulator having at least four circulator ports including an input port and a plurality of sequential ports for circulating optical signals from the input port to a next sequential port in a circulating direction, the last of said sequential ports being an output port, and a wavelength selective means coupled to each of said sequential ports except said output port for reflecting a selected portion of said optical signals and transmitting another portion of said optical signals.

2. The device of claim 1 wherein said wavelength selective means is a grating reflector.

3. The device of claim 2 wherein said grating reflector is an in-fiber Bragg grating.

4. A device as defined in claim 2, wherein the grating reflector is designed to reflect at least a predetermined data channel and to transmit at least a predetermined other data channel.

5. The device of claim 1 further comprising a second optical circulator having at least three ports including an input port, and means for coupling one of said wavelength selective means of said device to said input port of said second optical circulator.

6. The device of claim 5 wherein said one of said wavelength selective means is coupled to a second port in the circulating direction of said first optical circulator.

7. The device of claim 5 adapted to receive optical signals through said input port and said sequential ports of said first optical circulator and transmit a combined signal through said output port of said first optical circulator.

8. The device of claim 5 adapted to receive said optical signals through said input port and transmit filtered signals through each of said sequential ports and said output port.

9. A system comprising at least two devices of claim 1 wherein at least one of said wavelength selective means of a first of said devices is coupled to the input port of another of said devices.

10. The system of claim 9 wherein said one of said wavelength selective means is coupled to a second port in the circulating direction of said first circulator.

11. A device as defined in claim 1, wherein the predetermined portion to be reflected comprises one or more optical channels, and wherein the other portion to be transmitted comprises one or more other optical channels.

* * * * *